United States Patent [19]
Howard

[11] Patent Number: 5,435,652
[45] Date of Patent: Jul. 25, 1995

[54] SELF-ADJUSTING BEARING ASSEMBLY

[76] Inventor: Durrell U. Howard, 306 Krameria Dr., San Antonio, Tex. 78213

[21] Appl. No.: 175,713

[22] Filed: Dec. 30, 1993

[51] Int. Cl.6 ............................................. F16C 23/04
[52] U.S. Cl. ....................................... 384/99; 384/209
[58] Field of Search ................. 384/99, 208, 209, 210, 384/206, 213

[56] References Cited

U.S. PATENT DOCUMENTS

| | | |
|---|---|---|
| 88,863 | 4/1869 | Finley . |
| 1,044,468 | 11/1912 | Kirk, Jr. . |
| 1,199,048 | 9/1916 | Breeze . |
| 1,824,271 | 9/1931 | Hufferd . |
| 1,872,099 | 8/1932 | Urschel . |
| 2,003,539 | 6/1935 | Hufferd . |
| 2,115,629 | 4/1938 | Gurley . |
| 2,537,552 | 1/1951 | Schlegel, Sr. . |
| 2,779,603 | 1/1957 | McRae . |
| 2,883,131 | 4/1959 | McNally . |
| 2,993,717 | 7/1961 | Gottschald . |
| 3,337,246 | 8/1967 | Moskovitz . |
| 3,950,006 | 4/1976 | Wood, Jr. . |
| 4,129,394 | 12/1978 | Eichinger et al. . |
| 4,995,755 | 2/1991 | Hyodo et al. . |
| 5,011,320 | 4/1991 | Love et al. . |
| 5,085,520 | 2/1992 | Fujan .......................... 384/209 |
| 5,116,159 | 5/1992 | Kern, Jr. et al. . |
| 5,149,067 | 9/1992 | Fruhauf et al. . |
| 5,154,530 | 10/1992 | Dresselhouse . |
| 5,159,742 | 11/1992 | Winter ............................ 384/99 |
| 5,205,666 | 4/1993 | Hollis . |

Primary Examiner—Lenard A. Footland
Attorney, Agent, or Firm—Pollock, Vande Sande & Priddy

[57] ABSTRACT

A self-adjusting bearing assembly comprising a rod end bearing having a ball member and a connector member, and a bearing seat component having at least two bearing seat members arranged to receive the ball member therebetween. The ball member has a substantially spherical segment providing an outer bearing surface, and the bearing seat members include spherically-shaped inner bearing surfaces for engaging the outer bearing surface of the ball member. The connector member extends through a conical passage formed by the bearing seat members, and this passage restricts pivotal movement of the rod end bearing. A slack removal mechanism urges a movable one of the bearing seat members toward the ball member; and comprises a pressure chamber adjacent a pressure surface of the movable bearing seat member, and a fitting for pressurizing this chamber with a fluid. The assembly may include a fitting for feeding lubricant to the bearing surfaces, and a fitting for preventing excessive chamber pressure.

25 Claims, 3 Drawing Sheets

SELF-ADJUSTING BEARING ASSEMBLY

FIELD OF THE INVENTION

The invention relates to the field of ball joints, and in particular, to a self-adjusting ball joint providing a slack free bearing assembly.

BACKGROUND OF THE INVENTION

Ball joints usually are made up of a ball member and a bearing seat member. Such joints may also be referred to as universal joints since they allow movement around the joint in all directions, unlike joints which allow movement around an axis in only one plane, such as hinges.

The ball member of ball joints has a spherically-shaped bearing surface formed over at least a portion of its outer surface. The bearing surface may be formed over only a central portion of the ball member and one or more other portions may have non-spherical surfaces. One side of the ball member may be connected to a connecting arm, rod, stub or other elongated means for attaching the ball member to a frame member, an arm member, or other support member. The connector member may include a threaded end which facilitates attaching the connector member to the support member.

The bearing seat member has a bearing surface on its inner surface which is shaped to complement the bearing surface on the ball member so that these bearing surfaces are in sliding engagement with each other. The bearing seat member of a bearing assembly has a passage connecting the interior socket formed by its bearing surface with the outside of the member. When the ball member is engaged in the socket of the seat member, the connector member attached to the ball member extends through this passage and is connected to the frame of whatever apparatus the bearing assembly is being used with. The passage must be sufficiently wide to allow the seat member freedom of movement over the desired range, but not so large as to allow the ball member to fall out of the socket or to allow the seat member to travel over too great a range of movement.

Ball joints and bearing assemblies having a ball member are used in a variety of well known applications. For instance, trailer hitches for automobiles towing trailers usually include a ball member attached to an arm which is then fixed to the frame of the car, and a bearing seat member attached to a tongue extending from the trailer being towed. Ball joints are also an integral part of vehicle steering assemblies and suspension systems. For example, in steering systems, ball joints may be used to connect a tie rod to a rod end bearing on the arm of a steering knuckle. In vehicle suspension systems, ball joints may be used to connect an independent suspension between the vehicle and the wheel. Ball joints are also used in a variety of other applications.

While ball joints of the type described above are in use, the bearing surfaces on the ball member and the bearing seat member rub against each other. As the two bearing surfaces rub against each other, the bearing surfaces can be worn down through friction. As the bearing surfaces are worn down, the joint becomes loose and steering control can become sloppy. As a result, members of a steering assembly, for example, may move from their intended positions and therefore slack develops in the steering assembly.

As a result, the vehicle will more easily move away from the path the operator directs it on, the vehicle steering will become less precise and less predictable, and the vehicle therefore may become difficult to control. For example, 0.002 to 0.003 inch of slack in the ball joint of a vehicle steering assembly is sufficient to cause the vehicle to turn away from straight ahead. Obviously, a vehicle having a steering assembly in which such slack exists can make the vehicle difficult to control, and may even be dangerous. The problems caused by a loose joint can be especially bad if the vehicle is a large vehicle, such as a truck.

Slack in other ball joints can cause similar problems. For instance, where a ball joint is incorporated into a trailer hitch, a slack joint can cause the trailer to sway from side to side behind the towing vehicle. Such a situation can be very dangerous both to the person trying to control the vehicle and other motorists on the road. Similarly, a slack joint in a vehicle suspension system can adversely effect the safety of the vehicle, as well as the quality of the ride and the comfort of the occupants.

As evident from the above discussion, slack in ball joints can have serious consequences to the apparatuses in which the ball joints are incorporated, and to the users thereof. There is therefore a need for a slack free ball joint assembly.

SUMMARY OF THE INVENTION

A principal object of the present invention is to overcome the foregoing problems of the prior art by providing a bail joint assembly which includes a mechanism for taking up slack in the ball joint as it develops. A further object is to provide such a ball joint mechanism which may be set and calibrated once, and then over time will remain true to those settings rather than becoming loose.

The present invention thus provides an improved design for a ball joint bearing assembly. This ball joint assembly may serve as a self-adjusting tie rod end between a tie rod and a rod end bearing mounted on the arm of a steering knuckle. In this tie rod end, the spherical head of the rod end bearing is captured between at least two plastic bearing seats each made of a low friction material and having inner surfaces configured complementarily to the spherical head. These two plastic bearings are contained within a first part of a cylindrical cavity formed in an enlarged end portion of the tie rod. A smaller diameter second part of the cavity cooperates with a first one of the plastic bearings to form a pressure chamber on the side thereof opposite to the spherical head.

An internal passageway formed through the first plastic bearing connects the pressure chamber with the interface between the spherical head of the rod end bearing and the plastic bearings. An internal grease fitting is secured in the passageway and has a spring loaded check valve which prevents unrestricted flow of the grease out of the pressure chamber, so that grease in the chamber may be pressurized to maintain a slack preventing force on the first plastic bearing.

An external passageway connects the pressure chamber with the outside environment. An external grease fitting is secured within this passageway for admitting grease to pressurize the chamber. A seal means between the first plastic bearing and the sidewall of the larger diameter first part of the cavity prevents grease in the pressure chamber from flowing around the edges of the bearing.

A screw-in end capnut is placed within the outer portion of the first part of the cavity adjacent to the outer side of the second plastic bearing, and holds the plastic bearings and the spherical head in the tie rod end cavity. The ball member has a bearing surface formed over only a portion of its outer surface, and the bearing seat member has an inner bearing surface with a greater surface area than the bearing surface of the ball member to ensure that the ball member rides on an opposing bearing surface at all times. This in turn ensures a wide range of movement for such components as may be attached to the seat member. Additionally, a precisely machined bearing surface does not have to be formed over as large a surface area of the ball member, and the weight of the bearing assembly may be reduced.

In operation, the pressure chamber is filled with a sufficient amount of grease to create a substantial pressure against the first plastic bearing, thereby forcing it against the spherical head of the rod end bearing. This pressure not only holds the spherical bearing head in place against the second plastic bearing, but also takes up any slack as the head wears against the plastic bearings and vice versa. Thus, pressure of the grease within the pressure chamber will eliminate any slack that might otherwise develop between the rod end bearing and the tie rod. The design of the check valve in the internal grease fitting is such that a chamber pressure exceeding the spring force of this check valve will cause grease to enter and lubricate the interface between the plastic bearings and the spherical head of the rod end bearing.

In a modification of the invention, the internal grease fitting described above is eliminated in favor of a second external grease fitting for supplying grease from a grease gun directly to the interface between the spherical head of the rod end bearing and the plastic bearing seats. The pressure chamber may then be pressurized with either a lubricant or a non-lubricating type of fluid supplied thereto through the first external grease fitting. The pressure of the fluid in the pressure chamber of this embodiment is regulated by an adjustable pressure relief valve also mounted externally on the bearing housing in a passageway connecting the pressure chamber with the outside environment. This embodiment has the further advantage of allowing control of fluid pressure in the pressure chamber to be independent of the pressure required to inject grease into the bearing head-to-seat interface, such as where relatively light contact between the bearing surfaces may be desirable to facilitate ease of movement between articulated segments of a robotic arm.

BRIEF DESCRIPTION OF THE DRAWINGS

The invention may be further understood from the following detailed description thereof taken in conjunction with the accompanying drawings in which.

DETAILED DESCRIPTION OF THE PREFERRED EMBODIMENTS

Figure 1:
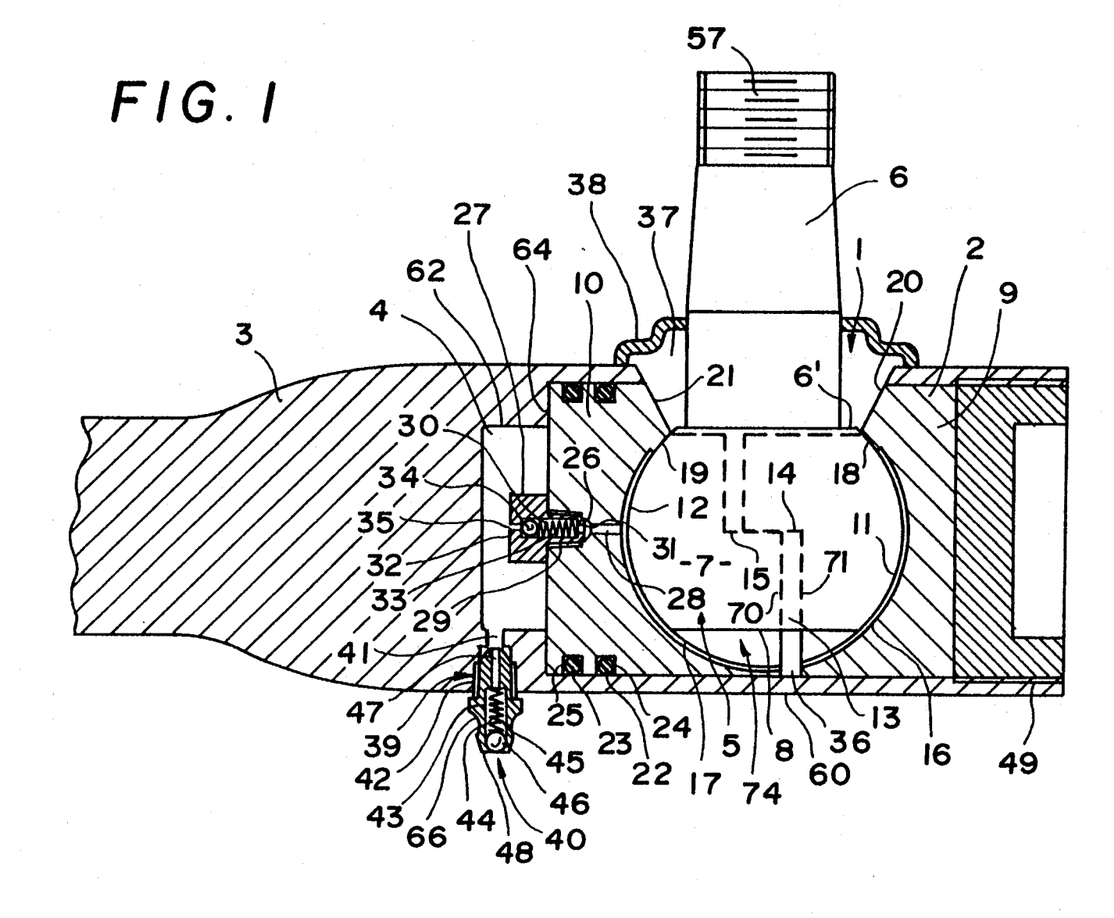
FIG. 1 is an elevational side view in cross section of a self-adjusting bearing assembly according to one embodiment of the present invention.

FIG. 1 shows a preferred embodiment of a self-adjusting bearing assembly according to the present invention. This embodiment may be incorporated into a vehicle steering assembly, and is only one example of a self-adjusting bearing assembly which may be made in accordance with the teachings of the present invention. The embodiments may vary, depending upon the application. Thus, variations of the bearing assembly and of its ball joint may be incorporated into a variety of devices.

Each of the components of the bearing assembly may be made up of a plurality of elements. The invention may also include various other components.

The self-adjusting bearing assembly, according to the embodiment shown in FIG. 1, includes a rod end bearing 1, a bearing seat means 2, a bearing housing 3, and a pressure chamber 4. The rod end bearing 1 comprises a ball member 5 and a connector member 6. The ball member 5 includes a spherically-shaped bearing surface 7. The bearing surface 7 may cover the entire ball member 5 with the exception of the connector member 6. Alternatively, the bearing surface 7 may be formed on only a mid-section of the ball member as in the embodiment shown in FIG. 1.

The bearing surface 7 may also have a non-spherical shape. For example, the ball member may be replaced by a head member having an elliptical cross-section. The major axis of the elliptical cross-section would be positioned parallel to the longitudinal axis of the connector member to allow the head member to rotate about the major axis. However, the head member would resist movement about other axes.

In the embodiment shown in FIG. 1, two portions of the ball member do not have a bearing surface formed on them. One of these has a substantially flat end surface 8 indented from where the surface of a complete sphere conforming to the bearing surface 7 would otherwise be located. End surface 8 cooperates with a pair of bearing seat members 9 and 10 to form an unpressurized lubricant chamber 74. The other portion of the ball member not having a bearing surface is the proximal portion 6' connected to the connector member 6.

The connector member 6 of the rod end bearing 1 is a generally elongated member extending outward from the ball member 5. In the embodiment shown in FIG. 1, the length of the connector member 6 is about one to two times the diameter of the ball member. However, the connector member is not limited to that length and therefore it may be longer or shorter, depending upon the application. The connector member may also have other shapes.

The connector member preferably includes connection means. The connection means on the connector member 6 may be a threaded connection 57 formed on its distal end as in the embodiment shown in FIG. 1. The connection means is used to connect the rod end bearing 1 to a support member of the apparatus on which the bearing assembly is being used. Other types of connection means may be used to attach the rod end bearing to the apparatus.

The ball member and connector member may be formed from the same piece of metal or may be formed separately and then joined together. The ball member and the connector member may be cast separately in different molds and then joined together, or they may be cast as one piece. Alternatively, the ball and the connector may be forged separately or together. Other materials, such as plastic, and other techniques may also be used to form the ball member and the connector member.

The self-adjusting bearing assembly also comprises bearing seat means 2. The bearing seat means 2 includes at least two bearing seat members. Each bearing seat member may be made up of one or more pieces. In the embodiment shown in FIG. 1, the bearing seat means 2 has two bearing seat members 9 and 10. These bearing seat members are made up of one piece. The bearing seat members preferably are made of low friction plastic, but may be made of any suitable bearing material.

The bearing seat members 9 and 10 are housed within a first cylindrical chamber 36 of housing means 3. Preferably, the entire perimeter of at least some portion of each bearing seat member directly contacts the interior surface of cylindrical chamber wall 60. At least one bearing seat member must be movable. The other bearing seat member may be fixed or movable. In the embodiment shown in FIG. 1, one bearing seat member is fixed and one is movable.

The housing means 3 in the embodiment shown in FIG. 1 is a single, elongated, hollow cylindrical body which is open at one end and is formed at the right end of a tie rod 50. The bearing assembly of the invention is also used at the left end (not shown) of tie rod 50, this left end bearing assembly being a mirror image of that shown in FIG. 1. The housing means 3, the seat members 9 and 10 and the chambers 4 and 36 may have other cross-sectional shapes, such as oval and rectangular, as long as the space within the housing means can accommodate the seat members, the ball member, and the pressure chamber. Also, the housing means 3 may comprise a plurality of housing members joined together to form a single housing structure.

The first interior chamber 36 preferably has a lateral opening 37 formed through wall 60, and through which the connector member 6 extends. Preferably, the width of opening 37 is at least as large as the opening defined by the beveled portions of the bearing seal members 9 and 10. The opening may be circular, square or any other suitable shape. Preferably, the area between the side of the opening 37 and the connector member 6 is sealed by a boot seal 38. The boot seal 38 preferably is made of an elastomeric material which will flex as the connector member 6 pivots to follow the rotation of ball member 5 within chamber 36. The boot seal contacts or is attached to the sidewall 60 of the housing means 3 and to the side surface of the connector member 6. The boot seal 38 helps to contain any lubricant which seeps out from between the ball member 5 and the bearing seat members 9 and 10, and also to prevent dirt and other debris from entering the bearing assembly.

The pressure chamber 4 is provided in housing means 3 by a second cylindrical chamber contiguous to, but of smaller diameter than, first cylindrical chamber 36. The movable bearing seat member 10 substantially abuts pressure chamber 4 initially, i.e., before substantial wear has occurred. If more than one movable bearing seat member is included in the embodiment, a pressure chamber would be located adjacent to each movable bearing seat member. An elevated pressure created within the pressure chamber forces the movable bearing seat member(s) toward the ball member 5. The elevated pressure is created by a fluid substance being introduced into the pressure chamber 4. The opening of the pressure chamber 4 facing the movable bearing seat member 10 preferably has a smaller cross-sectional area than the first chamber so that the rim of this opening provides a seat for the bearing seat member 10, and to limit the size of the pressure chamber, which consequently limits the amount of lubricant required to be introduced into the pressure chamber to create the desired pressure.

The bearing seat members 9 and 10 have bearing surfaces 11 and 12, respectively, formed on the surface which faces the ball member and engages its bearing surface. The seat member bearing surfaces preferably are complementarily shaped to the bearing surface 7 on the ball member 5. Therefore, as with the bearing surface on the ball member, the bearing surface on the seat member preferably is spherically-shaped.

The bearing seat members preferably extend around a majority of the surface of the ball member. However, the bearing seat members stop short of the area of the ball attached to the connector member. The bearing seat members also may form a gap adjacent to the area of the ball member opposite the connector member. Preferably, at least a portion of the bearing surface on the bearing seat members directly contacts and rides on the bearing surface on the ball member. However, as described below, a majority of the bearing surfaces of the bearing seat members may be separated from the bearing surface of the ball member by a thin layer of a lubricating substance.

Preferably, a compression slot 13 exists between the two bearing seat members 9 and 10 when the bearing assembly is assembled. The compression slot 13 allows the bearing seat members 9 and 10 to adjust their position relative to the ball member in response to pressure in the pressure chamber as the bearing surfaces wear, as described further below. The compression slot 13 preferably defines the closest approach of one bearing seat member to the other.

The compression slot 13 also includes two guide surfaces 14 and 15 formed on the bearing seat members 9 and 10, respectively. The guide surfaces 14 and 15 are formed by stepping the slot edge 70 of compression slot 13 inwardly on bearing seat member 10 and stepping the slot edge 71 outwardly on bearing seat member 9. The resulting compression slot is shown by broken lines in FIG. 1. The guide surfaces 14 and 15 preferably abut as shown in FIG. 1. These guide surfaces help guide the seat members during assembly of the bearing assembly and maintain the bearing seat members in proper alignment when seat member 10 moves as the bearing surfaces wear.

To facilitate the lubrication of the interface between the bearing surfaces on the ball member and the bearing seat members, the bearing seat members 9 and 10 include lubrication access grooves 16 and 17, respectively. The lubrication access groove, if included on the bearing seat members, is a narrow, shallow indentation which extends radially and axially along the bearing surface of each seat member. The access grooves on opposing seat members 9 and 10 are aligned so that a continuous groove is formed at least partially around opposite sides of the ball member. The peripheral extent of the continuous groove is defined by end walls 18 and 19 on seat members 9 and 10, respectively. The groove end walls 18 and 19 prevent the lubricant contained in the access grooves 16 and 17 from leaking out into the free space around the connector member. The continuous groove is supplied with the lubricating substance (lubricant) via an outlet passage 26 formed in the movable bearing seat member 10. Passage 26 connects access groove 17 between the ball member 5 and the bearing seat member 10 with the pressure chamber 4, in which a supply of lubricant is kept under pressure.

The lubricant, such as grease or another lubricating fluid, may also be introduced into the space between the ball member and the bearing seat members by other means. For example, a passage communicating directly with the compression slot 13 may be formed in the housing means 3 for introducing the lubricating substance between the ball member and the bearing seat members.

The bearing seat members 9 and 10 preferably include outwardly beveled surfaces 20 and 21, respectively, on the portion of the bearing seat members facing the connector member 6. The beveled surfaces 20 and 21, as in the embodiment shown in FIGS. 1 and 2, preferably are flat surfaces which are angled away from the connector member so that the opening between the bearing seat members becomes wider as the distance away from the ball member increases. The beveled surfaces allow the rod end bearing to pivot around the center of ball 5 by providing a space for the connector member 6 to move laterally. The beveled surface may also act as a stop surface to limit the arc through which connector member 6 may pivot relative to housing means 3.

In the embodiment shown in FIG. 1, bearing seat member 9 is fixed within housing means 3 and bearing seat member 10 is movable toward the right in response to lubricant pressure in the pressure chamber 4. The movable bearing seat member adjacent to the pressure chamber, which is the left bearing seat member 10 in the embodiment shown in FIG. 1, will preferably have at least one O-ring sealing member disposed about its outer surface to sealingly engage the surface of a wall 60 which defines the cylindrical chamber 36 in housing means 3. The embodiment shown in FIG. 1 includes two such sealing members 22 and 23. These sealing members seal the small clearance between the bearing seat member 10 and the housing wall 60, which helps to prevent pressurized lubricant contained in pressure chamber 4 from leaking around the exterior of bearing seat member 10 and into the opening 37 adjacent to connector member 6. This in turn helps to maintain the pressure on the lubricant in pressure chamber 4. Although in the embodiment shown in FIG. 1, only the bearing seat member 10 is movable and has sealing members, each bearing seat member may be movable by a corresponding pressure chamber and may have corresponding sealing member(s).

The movable bearing seat member 10 preferably includes grooves 24 and 25 for receiving sealing members 22 and 23, respectively. The groove helps to maintain each sealing member in the proper position for sealingly engaging wall 62. As seat member 10 moves due to wearing of the bearing surfaces, grooves 24 and 25 will ensure that the sealing members 22 and 23 do not move relative to the seat member.

The movable bearing seat member 10 preferably also includes a threaded part of the outlet passage 26 for receiving the threaded end of an internal check valve fitting 27. As previously indicated, the passage 26 provides fluid communication between the pressure chamber 4 and the surface of the ball member for the purpose of introducing the lubricant contained in the pressure chamber into the interface between the ball member 5 and the bearing seat members 9 and 10.

Passage 26 preferably has a first, narrow portion 28 and a wider, second portion 29, the latter for receiving the internal fitting 27. Internal fitting 27 and passage 26 provide means for relieving excess pressure within pressure chamber 4, while simultaneously introducing the lubricating substance around the ball member, as described in more detail below. The internal fitting and the passage may include connecting means other than a threaded connection for retaining the internal fitting in the passage. For example, the internal fitting may be welded to the passage wall, or held in the passage by frictional engagement between the internal fitting and the passage, such engagement being enhanced by the pressure of lubricant in the pressure chamber.

The internal fitting 27 includes a central passage 30 having inwardly projecting lips 31 and 32 formed at its respective ends so that a spring 33 and a ball valve 34 are held in place within the central passage. After the spring and ball valve are inserted in passage 30, one end of the spring 33 is retained by the lip 31 which may be formed by swaging. At the other end, the spring applies pressure to the ball valve 34, forcing the ball valve 34 to close a smaller inlet passage 35 defined by the lip 32 which serves as a seat for the ball valve. Fitting 27 serves as a check valve because flow from passage 30 into chamber 4 is prevented when ball valve 34 is held in its seated position by spring 33. Lubricating fluid will only flow through the internal fitting if the pressure within pressure chamber 4 is sufficiently great to overcome the spring force of the spring 33 in the internal fitting 27. The pressure required to open ball valve 34 may be changed by changing the spring within the internal fitting.

Preferably, the fluid introduced into the pressure chamber 4 is a liquid. More preferably, the fluid is a lubricating liquid, such as grease. By using grease as the pressure generating fluid, this fluid serves a second purpose, namely, the grease lubricates respective the bearing surfaces by passing through the internal fitting 27 and into the interfacial area between the ball member 5 and the bearing seat members 9 and 10.

The grease may be introduced into pressure chamber 4 through an external passage 39 containing an external fitting 40. The external passage 39 is formed in the sidewall 62 of pressure chamber 4 and the external fitting 40 is preferably threaded therein. The external passage 39 and external fitting 40 preferably are similar to the internal passage 26 and the internal fitting 27 in the movable bearing seat 10. The external passage 39 has a smaller diameter portion 41 leading to the pressure chamber 4 and a larger diameter threaded portion 42 for receiving the threads of the external fitting 40.

The external fitting 40 has an internal passage 43 formed through its entire length. The passage 43 preferably includes a central portion 44 of sufficient diameter to contain a spring 45 and a ball valve 46. Smaller diameter end portions 47 and 48 are formed at each end of central portion 44 to retain spring 45 and ball 46 within the passage 43. The ball 46 is forced outward against a valve seat 64 in end portion 48 by the spring 45 and also by the pressurized fluid within the pressure chamber 4. Thus, the external fitting 40 is a one-way check valve which allows grease to be introduced into the pressure chamber but prevents the grease from leaving the chamber. Internal fitting 27 therefore provides the only outlet for grease in pressure chamber 4.

The external fitting 40 may also be secured in the external passage 39 by suitable means other than the threaded connection shown in FIG. 1, such as by welding, swaging or the like. The portion of external fitting 40 which extends away from the surface of housing means 3 may include means, such as annular groove 66, for attaching a source of the lubricant to be used in the pressure chamber 4, such as a grease gun (not shown). The attachment means is used to facilitate the introduction of lubricant under pressure into the pressure chamber.

Fluid is introduced into the pressure chamber 4 until the pressure is sufficient to hold the bearing seat members 9 and 10 securely against the ball 5 while all steering forces necessary for precisely steering vehicle wheel 52 are being transmitted between tie rod 50 and rod end bearing 1. When the fluid pressure exceeds the force of spring 30 on ball 34 in the internal fitting 27, the fluid will be forced around ball 34, through bearing seat passage 26 and access grooves 17 and 16, and into the interface between the ball member and the bearing seat members. The pressurized fluid is prevented from flowing between the bearing seat member 10 and the housing wall 60 by the O-ring sealing members 22 and 23. These sealing members will prevent the fluid from traveling around bearing seat member 10 as this seat member moves due to wear on the bearing surfaces.

Also provided within the housing means 3, and located opposite to the pressure chamber 4, is means to secure the bearing seat members and the ball within the housing chamber 36. As shown in FIG. 1, the bearing seat members 9 and 10 and the ball 5 are secured within the chamber 36 of housing means 3 by an end capnut 49. The capnut 49 is secured within the distal end portion of housing chamber 36 by a threaded connection comprising screw threads on the outer surface of the capnut and on the inner surface of chamber wall 60.

The embodiment of the bearing assembly shown in FIG. 1 is assembled by inserting the movable bearing seat member 10 into the first housing chamber 36 until it abuts the end wall 64 of this cavity. Next, the ball member 5 of the rod end bearing 1 is inserted through the opening 37 in the sidewall 60 of the housing means 3. Then, the stationary fixed bearing seat member 9 is inserted into the housing chamber 36 until it abuts the ball member 5.

Subsequently, the end capnut 49 is secured within the distal end portion of the housing chamber 36, thereby securing the bearing seat members and the ball of the rod end bearing within the housing means 3. The end capnut 49 preferably is inserted far enough into the housing means so that the pressure applied to the ball member 5 by the two bearing seat members 9 and 10 is sufficient to prevent any significant slack between the ball member and the bearing seat members, but not so great that the ball member will not move freely with a lubricant between the bearing surfaces. The boot sealing member 38 may then be placed about the connector member 6 and secured to the connector member and the housing means.

Finally, grease is introduced into the pressure chamber 4 through external fitting 40 until the pressure is sufficient to open the check valve in fitting 27. Grease then flows through passage 28 and grooves 16 and 17, and spreads out over the bearing surfaces 11 and 12 of bearing seat members 9 and 10. As these bearing surfaces wear, movable seat member 10 moves away from chamber end wall 64 to maintain the slack free engagement between the bearing surfaces 11 and 12 and the opposing bearing surface of ball 5.

Figures 2, 3:
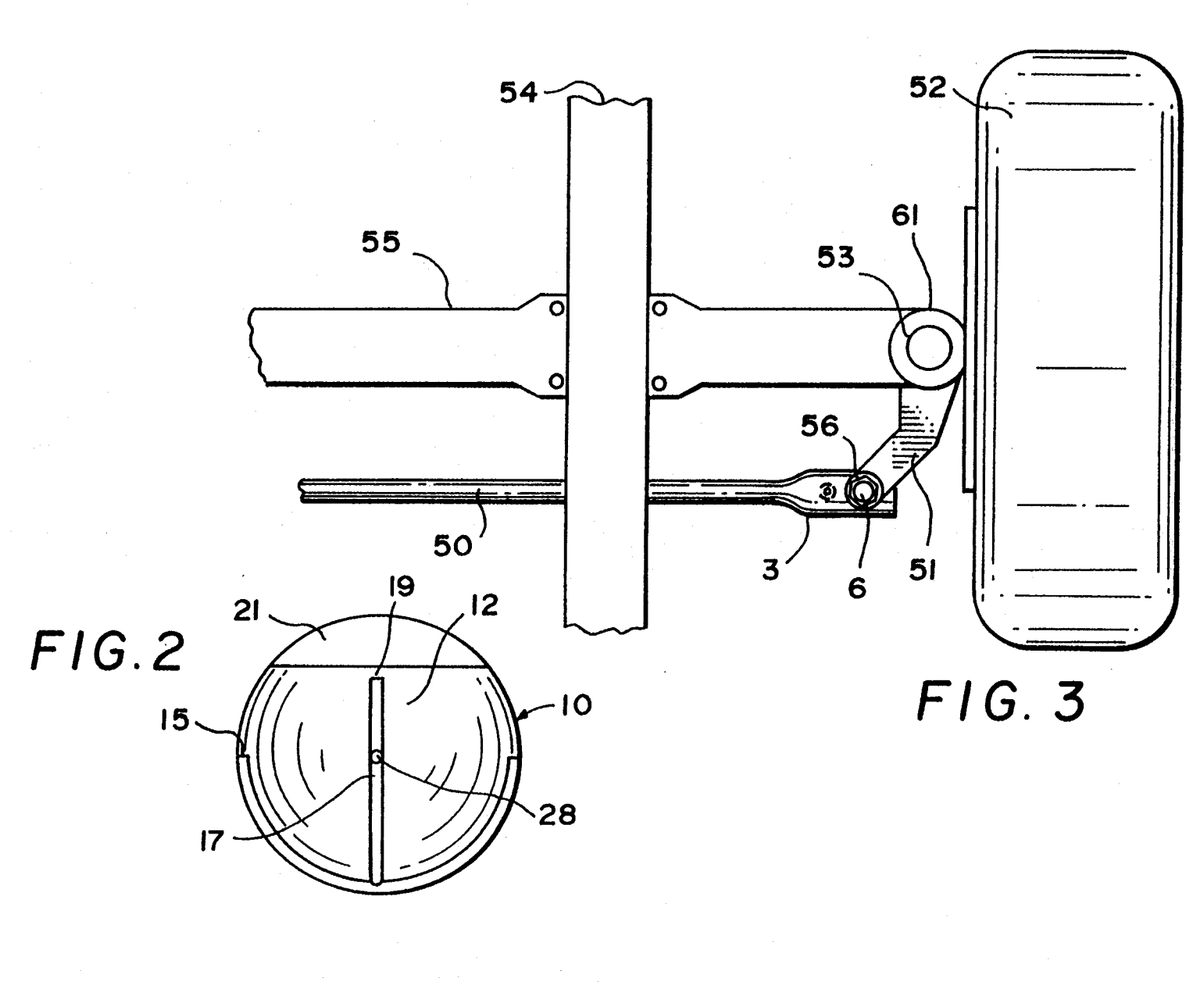
FIG. 2 is an end view of the inner face of one of the bearing seat members shown in side elevation in FIG. 1.
FIG. 3 is an overhead view of the embodiment shown in FIG. 1 incorporated into a vehicle steering assembly; and, FIG. 4 is an elevational side view in cross section of a self-adjusting bearing assembly according to another embodiment of the present invention.

FIG. 3 shows the bearing assembly of the present invention being used in the steering assembly of a land vehicle, such as a truck or automobile. The self-adjusting bearing 3 connects the tie rod 50 of the steering system to the arm 51 of a steering knuckle 61. Other components of the steering and suspension system shown in FIG. 2 include the vehicle wheel 52, a king pin 53, leaf springs 54, and axle 55. The connector member 6 of the rod end bearing is secured to the arm 51 by a nut 56.

Figure 4:
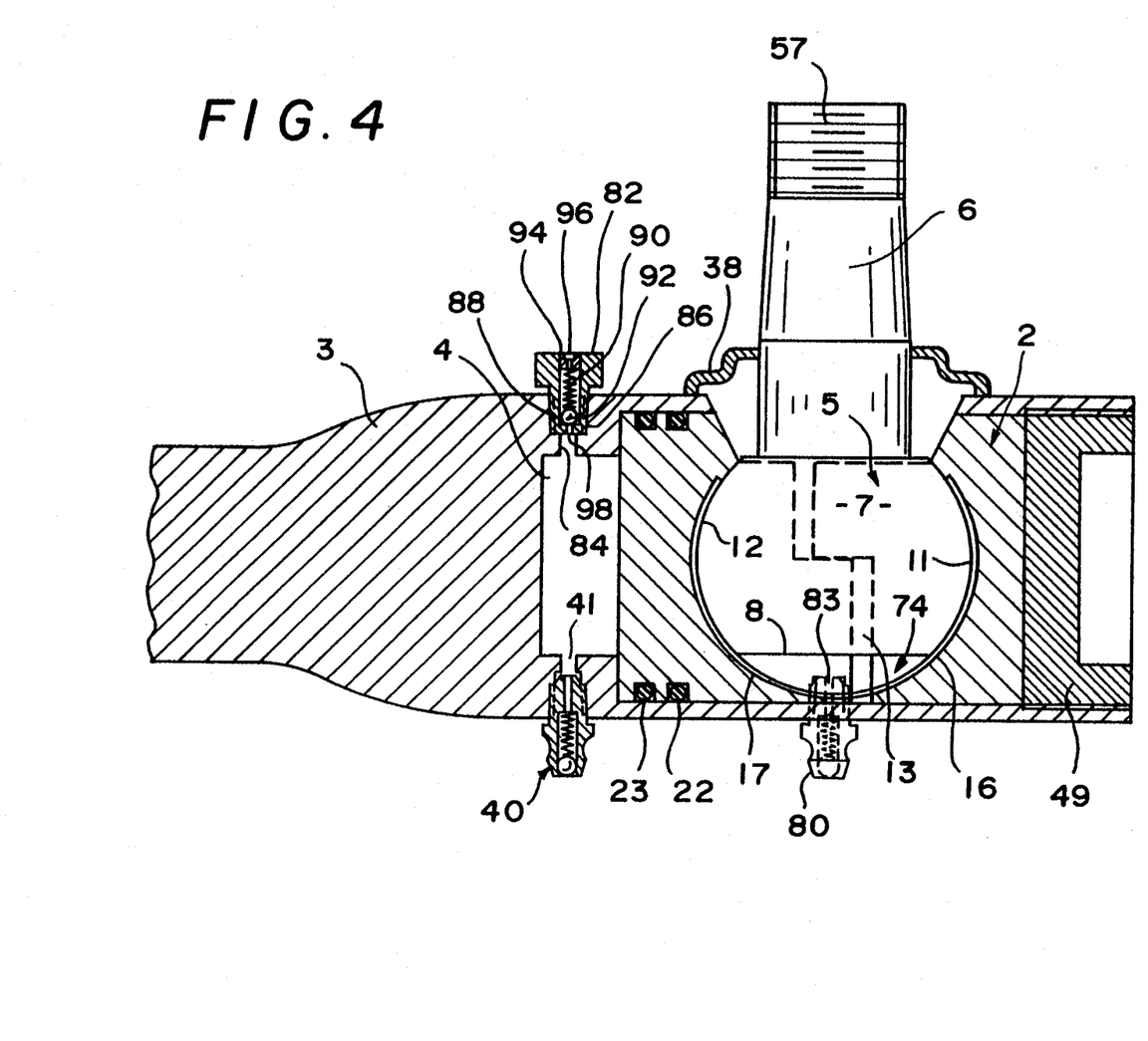

Another embodiment of the invention is shown in FIG. 4, in which the same part numerals have been retained where the parts shown are the same as those already described with reference to FIG. 1. The embodiment of FIG. 4 differs from the embodiment of FIG. 1 in that the internal lubricant fitting 27 has been eliminated in favor of a second external lubricant fitting 80 and a pressure chamber relief valve 82. The internal components of fitting 80 are the same as those of the first external fitting 40, which is described above. External fitting 80 supplies lubricant directly to the unpressurized chamber 74 through a small diameter passage 83 opposite to distal end surface 8 of spherical head 5. Lubricant in chamber 74 is distributed to the interface between the bearing surfaces on the ball member 5 and the bearing seat members 9 and 10 via the lubrication access grooves 16 and 17, respectively.

A predetermined level of pressure is maintained in pressure chamber 4 by relieving excess pressure through an external passage having a small diameter portion 84 leading from the pressure chamber 4, and a larger diameter threaded portion 86 for receiving the threads of the external pressure relief valve 132. The relief valve 82 has an internal passage extending through its entire length, the main portion 88 of which has a sufficient diameter to contain a spring 90 and a ball valve 92. An end plug 94 threaded within the outer portion of passage 88 provides a means for adjusting the tension of spring 90, thereby rendering adjustable the pressure setting at which relief valve 82 operates to prevent the fluid pressure in pressure chamber 4 from exceeding a predetermined valve. A small diameter passage 96 through end plug 94 and a small diameter passage 98 through an end wall at the inner end of main passage 88 are provided to retain spring 90 and ball 92 within passage 88.

External relief valve 82 provides the only outlet for the pressurized fluid in pressure chamber 4 since external fitting 40 is a one-way check valve, which allows fluid to be introduced into pressure chamber 4 but prevents this fluid from leaving the chamber through passage 41. The spring 90 forces ball 92 inward against the valve seat provided in the inner end wall containing passage 98, and the tension established in spring 90 by the variable position of plug 94 within central passage 88 of relief valve 82 allows the pressure at which fluid is released from pressure chamber 4 to be varied accordingly.

The specific constructions shown and described for the external and internal fittings in the embodiment of FIG. 1, and for the external fittings and relief valve in the embodiment of FIG. 4, are for the use of a liquid as the fluid for pressurizing pressure chamber 4. However, with appropriate modifications easily recognized by those skilled in the art, the internal and external fittings and the relief valve may be adapted for the use of a gas as the pressurizing fluid in pressure chamber 4.

The self-adjusting bearing assembly of the present invention may be used anywhere that known non-self-adjusting bearing assemblies are currently being used. Thus, self-adjusting bearings may be used in a number of other applications, such as the interconnected and articulated arm segments used in robotic assemblies of the types now widely employed in manufacturing assembly lines. In this application, a self-adjusting bearing assembly may be placed at each end of each segment of the robot's articulated arm(s).

The self-adjusting bearing assembly also may be used as a trailer hitch. In this application, the rod end bearing 1 would be attached to the rear of the vehicle frame as is normally the case with trailer hitches. The bearing seat portion of the assembly within its housing means 3 would be at the distal end portion of a tongue extending from the trailer.

In use, as the bearing assembly wears, the friction between the ball member and the bearing seat members will wear away some of the material at the bearing surfaces, preferably on the seat members. As the bearing surfaces wear, the pivotal joint provided by conventional bearing assemblies can become sloppy because space or gaps develop between opposing bearing surfaces. However, with the present invention, such space or gaps cannot develop between the bearing surface of the ball member and bearing surfaces 11 and 12 of the bearing seat members because, as the bearing surfaces wear, the pressure of lubricant in the pressure chamber 4 will continuously force the movable bearing seat 10 against the ball member 5 and the ball member 5 against the stationary bearing seat 9.

The bearing assembly of the present invention will need to be replaced much less frequently than conventional bearing assemblies because substantially greater amounts of wear can occur in the former relative to the latter without resulting in a slack connection. Thus, with a bearing assembly incorporating the present invention, replacement of the bearing parts can be delayed for a much longer period of time. The only maintenance which will routinely be required on the present invention is the addition of lubricant to maintain adequate pressure in the pressure chamber. The bearing components will only need to be replaced if they before severely worn, and it is believed that this may not occur during the useful life of many vehicles. However, if needed, replacement is easily accomplished by reversing the assembly procedure described above, followed by reassembly with new parts.

What is claimed is:

1. A self-adjusting bearing assembly, comprising:
bearing means comprising a ball member and a connector member, said ball member having an outer bearing surface shaped substantially as a segment of a sphere and extending about at least a central portion of the ball member;
housing means defining a bearing chamber;
bearing seat means comprising at least two opposing bearing seat members arranged in said bearing chamber to define therebetween a space for receiving said ball member, each of said bearing seat members having an inner bearing surface conforming substantially to the shape of the outer bearing surface of said ball member and arranged to engage the outer bearing surface of said ball member while allowing said ball member to rotate, at least one of said bearing seat members being movable in said bearing chamber, and said connector member extending through a passage formed at least in part by said housing; and
adjusting means for urging said movable bearing seat member toward said ball member such that the inner bearing surfaces of said seat members engage the outer bearing surface of said ball member, said adjusting means comprising a pressure chamber in said housing means in fluid communication with a pressure surface of said movable bearing seat member, and means for pressurizing said pressure chamber with a fluid, said pressure surface being on an opposite side of said movable bearing seat member from said ball member, and said movable bearing seat member being forced against said ball member when said pressure chamber is pressurized by said fluid.

2. A self-adjusting bearing assembly according to claim 1, wherein said pressure chamber is arranged in said housing adjacent to said bearing chamber, and said movable bearing seat member has a guiding surface for contacting a guiding surface of said bearing chamber.

3. A self-adjusting bearing assembly according to claim 1, wherein said pressurizing means comprises an inlet passage in fluid communication with the pressure chamber in said housing means, and valve means in said inlet passage for permitting said fluid to be introduced into said pressure chamber and for preventing said introduced fluid from escaping from said pressure chamber through said inlet passage.

4. A self-adjusting bearing assembly according to claim 1, wherein said movable bearing seat member comprises fitting means for permitting said fluid to be introduced from said pressure chamber through said movable bearing seat member into an interface between the inner bearing surface of said movable bearing seat member and the outer bearing surface of said ball member when said fluid pressure in said pressure chamber is greater than a predetermined value.

5. A self-adjusting bearing assembly according to claim 4, wherein said fluid is a lubricating substance and a groove is formed in a portion of the inner bearing surface of each of said bearing seat members, wherein said fitting means is received in a passage formed in said movable bearing seat member, and wherein the groove in said movable member bearing surface intersects said movable member passage, said groove providing a channel for distributing said lubricating substance between said outer bearing surface of the ball member and said inner bearing surfaces of the bearing seat members.

6. A self-adjusting bearing assembly according to claim 1, wherein the other of said bearing seat members is fixed in position within said housing means, and said movable bearing seat member is slidable within the bearing chamber of said housing means in a movement direction; wherein the inner bearing surface of said movable bearing seat member is adjacent said ball member on a side of said ball member substantially opposite the inner bearing surface of said fixed bearing seat member; and wherein said movable and fixed bearing seat members are separated by a slot, said slot extending transversely to said movement direction to provide a space between said bearing seat members to allow said movable bearing seat member to move toward said fixed bearing seat member in response to the pressure of fluid in said pressure chamber and the wearing of said bearing surfaces.

7. A self-adjusting bearing assembly according to claim 6, wherein said slot is defined by an edge of said movable bearing seat member facing a corresponding edge of said fixed bearing seat member; wherein each of said bearing seat members has a guide surface intersecting its said edge; and wherein one of said guide surfaces is formed by a lateral shift in one direction of said edge of said movable bearing seat member, and the other of said guide surfaces is formed by a lateral shift in the opposite direction of said edge of said fixed bearing seat member, said guide surfaces engaging each other to guide said movable bearing seat member as said bearing surfaces on said ball member and on said bearing seat members wear.

8. A self-adjusting bearing assembly according to claim 1 further comprising at least one resilient sealing member disposed between said movable bearing seat member and said housing means to prevent pressurized fluid from flowing out of said pressure chamber through an interface between said movable bearing seat member and said housing means.

9. A self-adjusting bearing assembly according to claim 1, wherein said housing means is provided by an end portion of a tie rod component of a vehicle steering assembly, and said connector member extends through an opening formed in a wall of said tie rod end portion; wherein said self-adjusting bearing assembly further comprises a boot member surrounding said connector member for sealing said wall opening, and a capnut; wherein said capnut comprises an external screw thread for engaging an internal screw thread within a distal section of said bearing chamber, and an inner stop surface for abutting an opposing surface of the other of said bearing seat members when said screw threads are engaged; and wherein said connector member includes means for connecting a distal end portion thereof to another component of said steering assembly.

10. A self-adjusting bearing assembly according to claim 1, wherein the bearing surfaces of said bearing seat members contact at least one-half of the surface area of said ball member.

11. A self-adjusting bearing assembly according to claim 1, wherein a portion of said connector member passage is formed by said bearing seat members, and wherein said passage portion is between said bearing seat members and becomes wider as the distance from said ball member increases, said passage portion restricting pivotal movement of said connector to limit the rotation of said ball member.

12. A self-adjusting bearing assembly according to claim 1 further comprising fitting means for introducing a lubricant into an interface between the bearing surface of said ball member and the bearing surfaces of said seat members.

13. A self-adjusting bearing assembly according to claim 12 further comprising pressure relief means for preventing fluid pressure in said pressure chamber from exceeding a predetermined value.

14. A self-adjusting bearing assembly according to claim 13, wherein said pressure relief means includes means for adjusting said predetermined value.

15. A self-adjusting bearing assembly according to claim 1 further comprising pressure relief means for preventing fluid pressure in said pressure chamber from exceeding a predetermined value.

16. A self-adjusting bearing assembly according to claim 15, wherein said pressure relief means includes means for adjusting said predetermined value.

17. A self-adjusting bearing assembly, comprising:
a ball member fixed to a connector member, said ball member having an outer bearing surface shaped substantially as a segment of a sphere and extending about at least a central portion of the ball member;
a housing defining a bearing chamber;
two opposing bearing seat members arranged in said bearing chamber to define therebetween a space for receiving said ball member, each of said bearing seat members having an inner bearing surface conforming substantially to the shape of the outer bearing surface of said ball member and arranged to engage the outer bearing surface of said ball member while allowing said ball member to rotate, at least one of said bearing seat members being movable in said bearing chamber, and said connector member extending through a passage formed at least in part by said housing;
a pressure chamber in said housing in fluid communication with a pressure surface of said movable bearing seat member, said pressure surface being on an opposite side of said movable bearing seat member from said ball member; and,
a fitting in fluid communication with said pressure chamber and comprising a valve for pressurizing said pressure chamber with a pressurized fluid, said at least one movable bearing seat member being urged toward said ball member and the inner bearing surfaces of said seat members engaging the outer bearing surface of said ball member in response to said chamber pressure.

18. A self-adjusting bearing assembly according to claim 17, wherein said fitting is received in an inlet passage formed in said housing, and said valve is a check valve permitting said fluid to be introduced into said pressure chamber while preventing said introduced fluid from escaping from said pressure chamber through said inlet passage.

19. A self-adjusting bearing assembly according to claim 17 further comprising a second fitting for permitting said fluid to be introduced from said pressure chamber through said movable bearing seat member into an interface between the inner bearing surface of said movable bearing seat member and the outer bearing surface of said ball member when said chamber pressure is greater than a predetermined value.

20. A self-adjusting bearing assembly according to claim 19, wherein said fluid is a lubricating substance and a groove is formed in a portion of the inner bearing surface of each of said bearing seat members, wherein said second fitting is received in a passage formed in said movable bearing seat member, and wherein the groove in said movable member bearing surface intersects said movable member passage, said grooves providing a channel for distributing said lubricating substance between said outer bearing surface of the ball member and said inner bearing surfaces of the bearing seat members.

21. A self-adjusting bearing assembly according to claim 17, wherein the other of said bearing seat members is fixed in position within said housing, and said movable bearing seat member is slidable within the bearing chamber of said housing in a movement direction; wherein the inner bearing surface of said movable bearing seat member is adjacent said ball member on a side of said ball member substantially opposite the inner bearing surface of said fixed bearing seat member; and wherein said movable and fixed bearing seat members are separated by a slot, said slot extending transversely to said movement direction to provide a space between said bearing seat members to allow said movable bearing seat member to move toward said fixed bearing seat member in response to said chamber pressure and the wearing of said bearing surfaces.

22. A self-adjusting bearing assembly according to claim 21, wherein each of said bearing seat members has a guide surface extending in the movement direction of said movable bearing seat member, said guide surfaces engaging each other to guide said movable bearing seat member as the bearing surfaces on said ball member and on said bearing seat members wear.

23. A self-adjusting bearing assembly according to claim 17, wherein said housing is provided by an end portion of a tie rod component of a vehicle steering assembly, and said connector member extends through an opening formed in a wall of said tie rod end portion; wherein said self-adjusting bearing assembly further comprises a boot member surrounding said connector member for sealing said wall opening, and a capnut; wherein said capnut comprises an external screw thread for engaging an internal screw thread within a distal section of said bearing chamber, and an inner stop surface for abutting an opposing surface of the other of said bearing seat members when said screw threads are engaged; and wherein said connector member includes a connector element for connecting a distal end portion thereof to another component of said steering assembly.

24. A self-adjusting bearing assembly according to claim 17, wherein a portion of said connector member passage is formed by said bearing seat members, and wherein said passage portion is between said bearing seat members and becomes wider as the distance from said ball member increases, said passage portion restricting pivotal movement of said connector to limit the rotation of said ball member.

25. A self-adjusting bearing assembly according to claim 17 further comprising a pressure relief valve for preventing fluid pressure in said pressure chamber from exceeding a predetermined value, said pressure relief valve including a mechanism for adjusting said predetermined value.

* * * * *